United States Patent
Zhu

(10) Patent No.: US 10,212,451 B2
(45) Date of Patent: Feb. 19, 2019

(54) METHODS FOR RDO (RATE-DISTORTION OPTIMIZATION) BASED ON FIT-CURVES AND APPARATUSES USING THE SAME

(71) Applicant: VIA Alliance Semiconductor Co., Ltd., Shanghai (CN)

(72) Inventor: ChuanChuan Zhu, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 298 days.

(21) Appl. No.: 15/175,429

(22) Filed: Jun. 7, 2016

(65) Prior Publication Data

US 2017/0324979 A1  Nov. 9, 2017

(30) Foreign Application Priority Data

May 3, 2016 (CN) .......................... 2016 1 0284379

(51) Int. Cl.
*H04N 19/567* (2014.01)
*H04N 19/176* (2014.01)
*H04N 19/593* (2014.01)
*H04N 19/119* (2014.01)
*H04N 19/147* (2014.01)
*H04N 19/172* (2014.01)

(52) U.S. Cl.
CPC ......... *H04N 19/567* (2014.11); *H04N 19/119* (2014.11); *H04N 19/147* (2014.11); *H04N 19/172* (2014.11); *H04N 19/176* (2014.11); *H04N 19/593* (2014.11)

(58) Field of Classification Search
CPC ... H04N 19/567; H04N 19/176; H04N 19/593

USPC .................................................... 375/240.12
See application file for complete search history.

(56) References Cited

U.S. PATENT DOCUMENTS

| 7,327,287 | B2 * | 2/2008 | Martinian | H03M 7/30 341/51 |
| 2011/0142124 | A1 * | 6/2011 | Huang | H04N 19/154 375/240.02 |
| 2012/0328002 | A1 * | 12/2012 | Vafin | H04N 19/176 375/240.03 |
| 2016/0094803 | A1 * | 3/2016 | Possos | H04N 7/012 348/448 |

OTHER PUBLICATIONS

"Series H: Audiovisual and Multimedia Systems—Infrastructure of audiovisual services—Coding of moving video; High Efficiency Video Coding;" Recommendation ITU-T H.265; Telecommunications Standardization Sector of ITU; Apr. 2013; pp. 1-317.

* cited by examiner

*Primary Examiner* — Huy T Nguyen
*Assistant Examiner* — Jae N Noh
(74) *Attorney, Agent, or Firm* — McClure, Qualey & Rodack, LLP

(57) ABSTRACT

A method for RDO (Rate-Distortion Optimization) based on fit-curves contains at least the following steps: calculating a first fit-curve and a second fit-curve according to information regarding a first frame; carrying information regarding a second frame into the first and second fit-curves to calculate fit distortions and fit bit counts; calculating costs according to the fit distortions and the fit bit counts; determining the best block-division mode for the second frame according to the costs; and dividing the second frame into blocks according to the best block-division mode and encoding the second frame.

8 Claims, 3 Drawing Sheets

METHODS FOR RDO (RATE-DISTORTION OPTIMIZATION) BASED ON FIT-CURVES AND APPARATUSES USING THE SAME

CROSS REFERENCE TO RELATED APPLICATIONS

This application claims the benefit of China Patent Application No. 201610284379.2, filed on May 3, 2016, the entirety of which is incorporated by reference herein.

BACKGROUND

Technical Field

The present invention relates to video encoding, and in particular, it relates to methods for RDO (Rate-Distortion Optimization) based on fit-curves and apparatuses using the same.

Description of the Related Art

RDO (Rate-distortion optimization) is the technology of improving video quality in video compression. It is used to optimize the amount of loss of video quality (the distortion) against the amount of data required to encode the video (the rate). Specifically, RDO determines an encoding mode to achieve a balance between the distortion and the rate to optimize video compression for a video compression system. The encoding mode may indicate a prediction mode, a MV (Motion Vector), a reference frame, or others. The purpose of the encoding-mode determination is to select the best one from multiple candidates. The video compression system may use the Lagrange R-D cost function to determine the best encoding mode as follows:

$$\min\{J\}, J = D + \lambda \cdot R \tag{1}$$

D indicates the distortion between a source-frame block and a reconstructed-frame block. In the video encoding system, D may be one of the following values depending on different design requirements: SAD (Sum of Absolute Difference); SATD (Sum of Absolute Transformed Difference); and SSD (Sum of Squared Difference). R indicates bit counts required by the determined prediction mode, MV, reference frame, residual, or others. $\lambda$ indicates a Lagrange constant. J is the result of the Lagrange R-D cost function. The object of RDO is to determine the candidate with the minimum value J as the best encoding mode, so as to achieve the optimized compression.

In the conventional RDO, the encoder needs to encode data several times, in each of which is together with one candidate, so as to obtain values R and D of the candidates. Then, the values R and D are input to the Equation (1) to obtain values J, and the candidate with the minimum of the values J is determined as the best encoding mode. However, each time the encoding is performed, the data should undergo T (Transform), Q (Quantization), IT (Inverse Transform), IQ (Inverse Quantization), reconstruction, entropy coding, and so on. It takes excessive computation to encode data several times. The conventional method realized in hardware circuits not only takes excessive hardware but also defers encoding so as to hinder the real-time response. Thus, methods for RDO based on fit-curves and apparatuses using the same are introduced to address the drawbacks.

BRIEF SUMMARY

An embodiment of the invention introduces a method for RDO (Rate-Distortion Optimization) based on fit-curves at least containing steps: calculating a first fit-curve and a second fit-curve according to information regarding a first frame; carrying information regarding a second frame into the first and second fit-curves to calculate fit distortions and fit bit counts; calculating costs according to the fit distortions and the fit bit counts; determining the best block-division mode for the second frame according to the costs; and dividing the second frame into blocks according to the best block-division mode and encoding the second frame.

An embodiment of the invention further introduces an apparatus for RDO based on fit-curves at least containing an intra-frame/inter-frame prediction module, an RD cost calculation module, and a curve-fitting module. The curve-fitting module calculates a first fit-curve and a second fit-curve according to information regarding a first frame, and carries information regarding a second frame into the first and second fit-curves to calculate fit distortions and fit bit counts. The RD cost calculation module calculates costs according to the fit distortions and the fit bit counts. The intra-frame/inter-frame prediction module determines the best block-division mode for the second frame according to the costs, and divides the second frame into blocks according to the best block-division mode and encodes the second frame.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. Furthermore, it should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
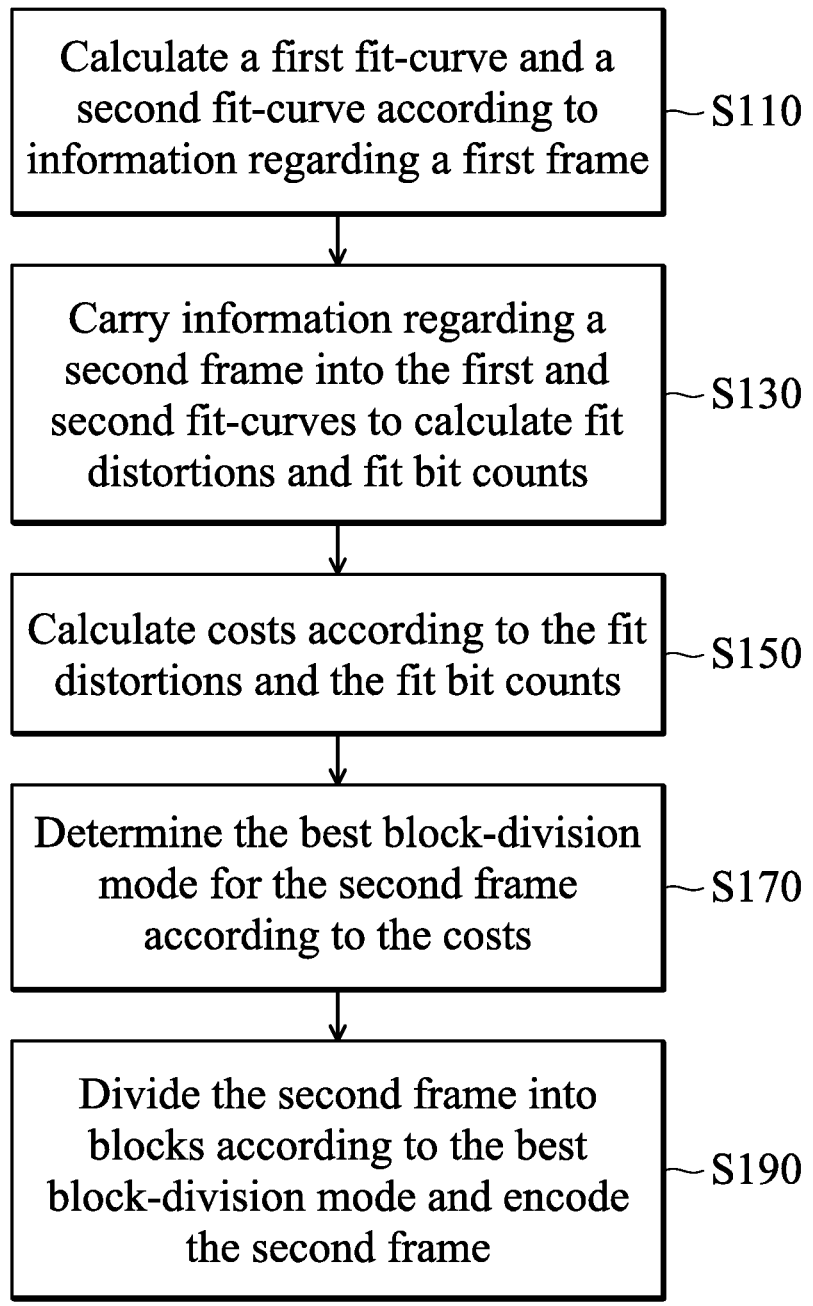
FIG. 1 is a flowchart illustrating a method for RDO based on fit-curves according to an embodiment of the invention.

Embodiments of the invention introduce a method for RDO (Rate-Distortion Optimization) based on fit-curves. The method needs to perform fit-curves for certain kinds of data. For an example, a curve fitting is performed on absolute values of syntax to be encoded and total amounts of encoded bits for the syntax to obtain a curve describing relationships between the absolute values of syntax and the total amounts of encoded bits for the syntax. In another example, a curve fitting is performed on distortions between the original frame and the predicted frame and distortions between the original frame and the reconstructed frame to obtain a curve describing relationships between these two kinds of distortions. The method does not need to calculate R and D values like the conventional methods in the subsequent RDO. Instead, after obtaining the curves, the method only requires to calculate the absolute values of syntax to be encoded and carry the absolute values into the corresponding fit-curve to obtain the corresponding values R', and calculate the distortions between the original frame and the predicted frame and carry the distortions to obtain the corresponding values D'. By using the fit-curves to calculate the values R' and D', the calculation complexity and the time deferring for encoding may be reduced. FIG. 1 is a flowchart illustrating a method for RDO based on fit-curves according to an embodiment of the invention. The method calculates a first fit-curve and a second fit-curve according to information regarding a first frame (referred to as a reference frame) (step S110), carries information regarding a second frame (referred to as a encoding frame) into the first and second fit-curves to calculate fit distortions and fit bit counts (step S130) and calculate costs according to the fit distortions and the fit bit counts (step S150). Next, the method determines the best block-division mode for the second frame according to the costs (step S170) and divides the second frame into blocks according to the best block-division mode and encodes the second frame (step S190).

Figure 2:
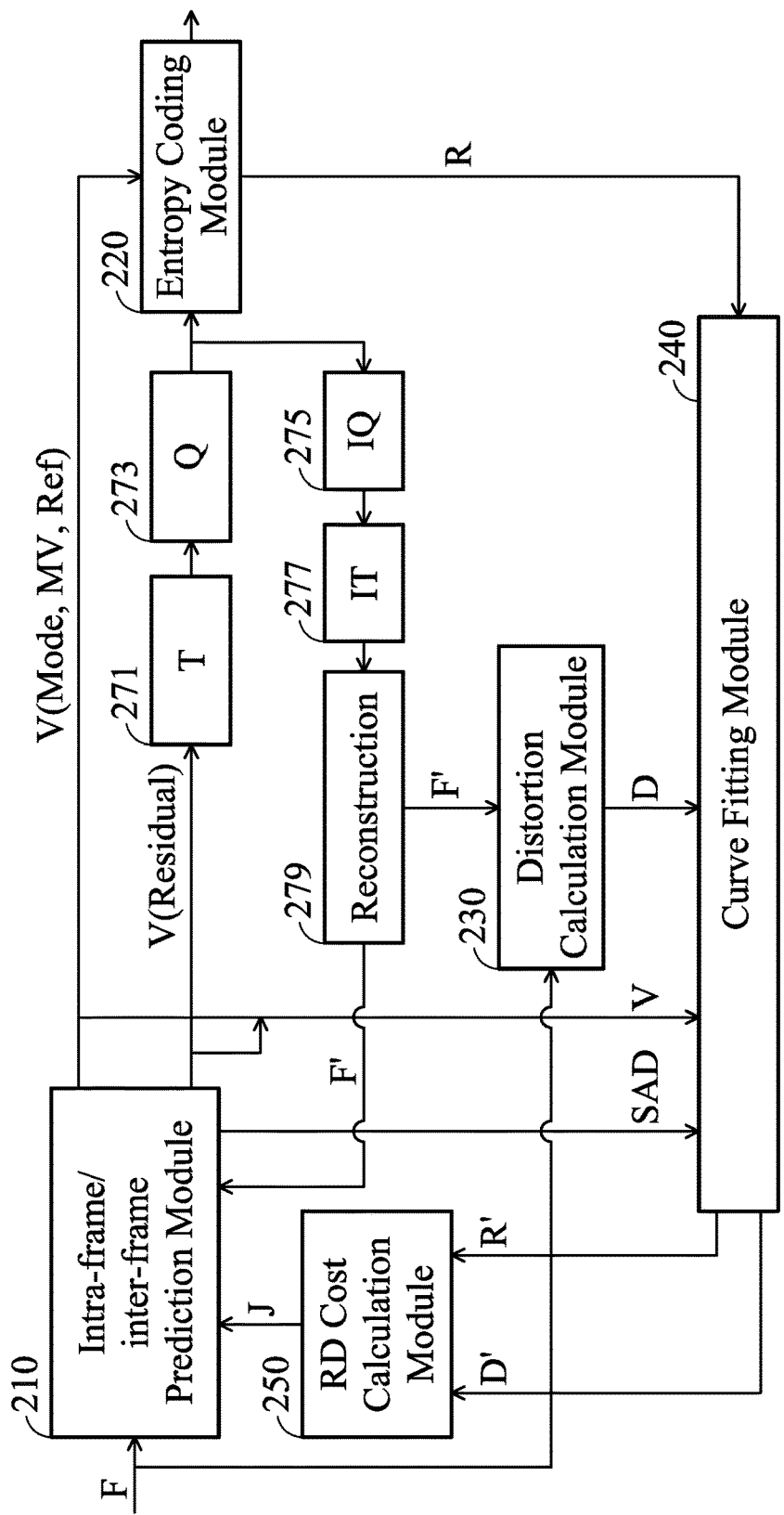
FIG. 2 is the system block diagram for RDO based on fit-curves according to an embodiment of the invention.

FIG. 2 is the system block diagram for RDO based on fit-curves according to an embodiment of the invention. The curve-fitting module 240 may fit a curve using an algorithm of GLS (Generalized Least Squares). GLS estimates the unknown parameters in a regression model under the minimum error sum of square. GLS can be used to perform regression when there is a certain degree of correlation between the explanatory variables (independent variables) of the regression model. The estimation function may be a third-order function as shown in the Equation (2):

$$y(x)=a \cdot x^3+b \cdot x^2+c \cdot x+d \quad (2)$$

The curve-fitting module 240 may calculate values a, b, c and d using the Equation (3):

$$\begin{bmatrix} \sum_{i=1}^{N} 1 & \sum_{i=1}^{N} x_i & \sum_{i=1}^{N} x_i^2 & \sum_{i=1}^{N} x_i^3 \\ \sum_{i=1}^{N} x_i & \sum_{i=1}^{N} x_i^2 & \sum_{i=1}^{N} x_i^3 & \sum_{i=1}^{N} x_i^4 \\ \sum_{i=1}^{N} x_i^2 & \sum_{i=1}^{N} x_i^3 & \sum_{i=1}^{N} x_i^4 & \sum_{i=1}^{N} x_i^5 \\ \sum_{i=1}^{N} x_i^3 & \sum_{i=1}^{N} x_i^4 & \sum_{i=1}^{N} x_i^5 & \sum_{i=1}^{N} x_i^6 \end{bmatrix} \cdot \begin{bmatrix} a \\ b \\ c \\ d \end{bmatrix} = \begin{bmatrix} \sum_{i=1}^{N} y_i \\ \sum_{i=1}^{N} x_i \cdot y_i \\ \sum_{i=1}^{N} x_i^2 \cdot y_i \\ \sum_{i=1}^{N} x_i^3 \cdot y_i \end{bmatrix} \quad (3)$$

Where N indicates a total amount of samplings, [$x_i$, $y_i$] indicates values of i-th pair of sampling. After values a, b, c and d are calculated according to information regarding one frame using the Equation (3), the fit-curve of the Equation (2) is generated accordingly. Subsequently, the curve fitting module 240 carries values x of the next frame into the Equation (2) to obtain values y. The curve fitting module 240 fits curves for the parts D and R of the Equation (1) using the Equations (2) and (3).

Specifically, for the curve fitting of the value D, the curve fitting module 240 may obtain distortions SAD between original pixel values and predicted pixel values of N different PUs (Prediction Units) of the frame from the intra-frame/inter-frame prediction module 210, and obtain distortions D between original pixel values and reconstructed pixel values of the PUs of the frame from the distortion calculation module 230, so as to obtain N pairs of [$x_{i1}$, $y_{i1}$], where $x_{i1}$ indicates the distortion between the original pixel value and the predicted pixel value of the i-th PU and $y_{i1}$ indicates the distortion between the original pixel value and the reconstructed pixel value of the i-th PU. Subsequently, the curve fitting module 240 may calculate values $a_1$, $b_1$, $c_1$ and $d_1$ using the Equation (4):

$$\begin{bmatrix} \sum_{i=1}^{N} 1 & \sum_{i=1}^{N} x_{i1} & \sum_{i=1}^{N} x_{i1}^2 & \sum_{i=1}^{N} x_{i1}^3 \\ \sum_{i=1}^{N} x_{i1} & \sum_{i=1}^{N} x_{i1}^2 & \sum_{i=1}^{N} x_{i1}^3 & \sum_{i=1}^{N} x_{i1}^4 \\ \sum_{i=1}^{N} x_{i1}^2 & \sum_{i=1}^{N} x_{i1}^3 & \sum_{i=1}^{N} x_{i1}^4 & \sum_{i=1}^{N} x_{i1}^5 \\ \sum_{i=1}^{N} x_{i1}^3 & \sum_{i=1}^{N} x_{i1}^4 & \sum_{i=1}^{N} x_{i1}^5 & \sum_{i=1}^{N} x_{i1}^6 \end{bmatrix} \cdot \begin{bmatrix} a_1 \\ b_1 \\ c_1 \\ d_1 \end{bmatrix} = \begin{bmatrix} \sum_{i=1}^{N} y_{i1} \\ \sum_{i=1}^{N} x_{i1} \cdot y_{i1} \\ \sum_{i=1}^{N} x_{i1}^2 \cdot y_{i1} \\ \sum_{i=1}^{N} x_{i1}^3 \cdot y_{i1} \end{bmatrix} \quad (4)$$

Finally, the curve fitting module 240 obtains the fit-curve calculated according to the distortions SAD and the distortions D by carrying $a_1$, $b_1$, $c_1$ and $d_1$ into the Equation (5):

$$y_1(x)=a_1 \cdot x^3+b_1 \cdot x^2+c_1 \cdot x+d_1 \quad (5)$$

Specifically, for the curve fitting of the value R, the curve fitting module 240 may obtain absolute values V of syntax of residuals of N different PUs (Prediction Units) of the frame from the intra-frame/inter-frame prediction module 210, and obtain bit counts R required to encode the syntax of the PUs of the frame from the entropy coding module 220, so as to obtain N pairs of [$x_{i2}$, $y_{i2}$], where $x_{i2}$ indicates the absolute value of syntax of residual of the i-th PU and $y_{i2}$ indicates the bit count required to encode the syntax of the i-th PU. Subsequently, the curve fitting module 240 may calculate values $a_2$, $b_2$, $c_2$ and $d_2$ using the Equation (6):

$$\begin{bmatrix} \sum_{i=1}^{N} 1 & \sum_{i=1}^{N} x_{i2} & \sum_{i=1}^{N} x_{i2}^2 & \sum_{i=1}^{N} x_{i2}^3 \\ \sum_{i=1}^{N} x_{i2} & \sum_{i=1}^{N} x_{i2}^2 & \sum_{i=1}^{N} x_{i2}^3 & \sum_{i=1}^{N} x_{i2}^4 \\ \sum_{i=1}^{N} x_{i2}^2 & \sum_{i=1}^{N} x_{i2}^3 & \sum_{i=1}^{N} x_{i2}^4 & \sum_{i=1}^{N} x_{i2}^5 \\ \sum_{i=1}^{N} x_{i2}^3 & \sum_{i=1}^{N} x_{i2}^4 & \sum_{i=1}^{N} x_{i2}^5 & \sum_{i=1}^{N} x_{i2}^6 \end{bmatrix} \cdot \begin{bmatrix} a_2 \\ b_2 \\ c_2 \\ d_2 \end{bmatrix} = \begin{bmatrix} \sum_{i=1}^{N} y_{i2} \\ \sum_{i=1}^{N} x_{i2} \cdot y_{i2} \\ \sum_{i=1}^{N} x_{i2}^2 \cdot y_{i2} \\ \sum_{i=1}^{N} x_{i2}^3 \cdot y_{i2} \end{bmatrix} \quad (6)$$

Finally, the curve fitting module 240 obtains the fit-curve calculated according to the syntax of residuals V and the bit counts R by carrying $a_2$, $b_2$, $c_2$ and $d_2$ into the Equation (7):

$$y_2(x)=a_2 \cdot x^3+b_2 \cdot x^2+c_2 \cdot x+d_2 \quad (7)$$

Figure 3:
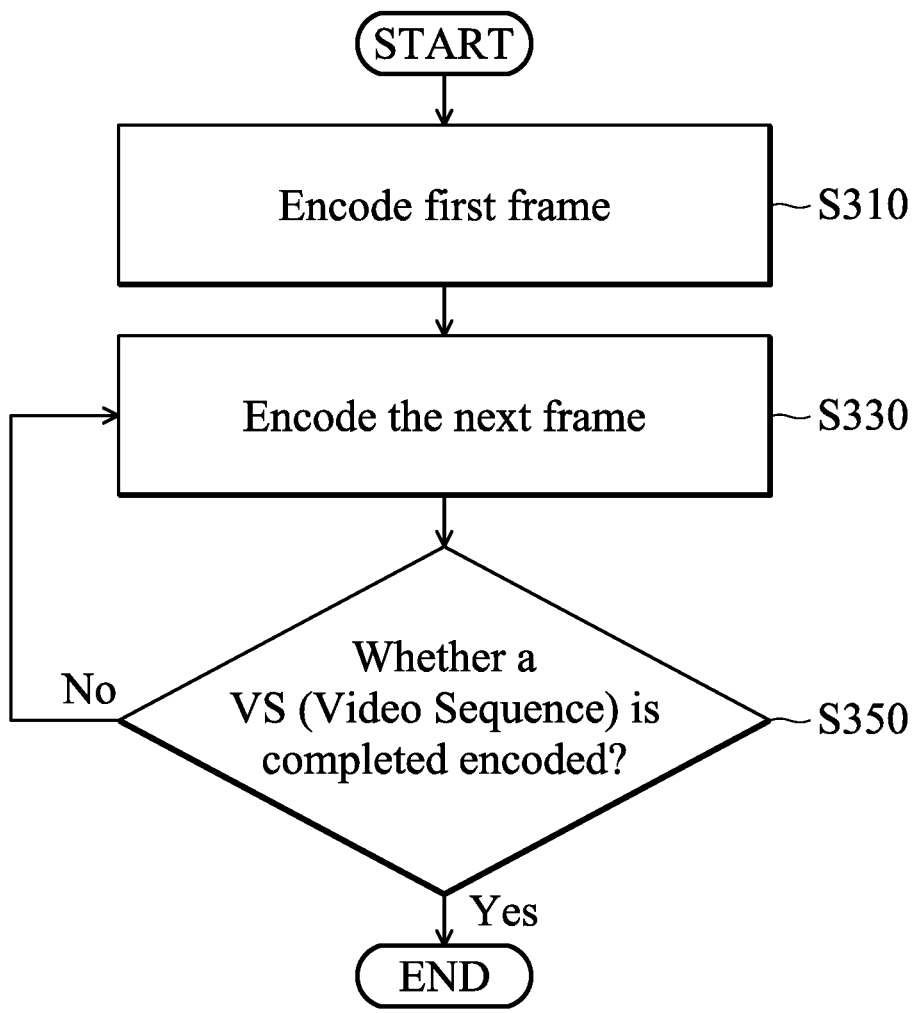
FIG. 3 is a flowchart illustrating a method of video encoding according to an embodiment of the invention.

FIG. 3 is a flowchart illustrating a method of video encoding according to an embodiment of the invention. The method is employed in the system as shown in FIG. 2. First, a first frame is encoded (step S310). Next, a loop is repeatedly performed to encode the next frame (step S330) until a VS (Video Sequence) is completed encoded (the "Yes" path of step S350). In step S310, RDO is not performed. When it is determined how to divide blocks, only the distortions SAD between the original frame and the predicted frame are used to perform the determinations, that is, J=SAD. Specifically, the intra-frame/inter-frame prediction module 210 directly employs the distortions SAD between the original frame and the predicted frame to perform block divisions. After the determinations, the intra-frame/inter-frame prediction module 210 may obtain the best block-division mode and record information regarding values SAD, residuals, MVs and reference frame, or others, under the best block-division mode. Subsequently, the T (Transform) 271, the Q (Quantization) 273, the IQ (Inverse Quantization) 275, the IT (Inverse Transform) 277, the entropy coding 220 and the reconstruction 279 are calculated for each block. The entropy coding module 220 records the bit counts R required in the entropy encoding and the bit counts R are output to the curve fitting module 240. In addition, the distortion calculation module 230 calculates the distortions D between the original frame F and the reconstructed frame F' and the distortions D are output to the curve fitting module 240. After collecting the required values, the curve fitting module 240 obtains the fit-curve $y_1(x)$ for the distortions D and the fit-curve $y_2(x)$ for the required bit counts R using the Equations (4), (5), (6) and (7). In step S330, the fit-curves y(x) are used to perform RDO. Specifically, the intra-frame/inter-frame prediction module 210 calculates values SAD of PUs and outputs the values SAD of PUs to the curve fitting module 240. The curve fitting module 240 carries the values SAD of PUs into the fit-curve $y_1(x)$ of the Equation (5) to obtain the fit distortions D'. The intra-frame/inter-frame prediction module 210 further calculates absolute values of syntax of residuals V of PUs and outputs the absolute values of syntax of residuals V of PUs to the curve fitting module 240. The curve fitting module 240 carries the absolute values of syntax of residuals V of PUs into the fit-curve $y_2(x)$ of the Equation (7) to obtain the fit bit counts R'$_r$ of PUs. All fit bit counts are summed to obtain a total amount of the fit bit counts R'. The RD cost calculation module 250 calculates the fit RD cost J=D'+λ·R' and outputs the fit RD cost to the intra-frame/inter-frame prediction module 210. Subsequently, the intra-frame/inter-frame prediction module 210 employs the values J to determine the best block-division mode. In the meantime, the frame also needs to undergo the calculations of step S310 to update the fit-curves $y_1(x)$ and $y_2(x)$.

The curve-fitting module 240 and the RD cost calculation module 250 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The intra-frame/inter-frame prediction module 210, the entropy coding module 220, the distortion calculation module 230, the T 271, the Q 273, the IQ 275, the IT 277 and the reconstruction 279 can be implemented in numerous ways, such as with dedicated hardware, or with general-purpose hardware that is programmed using microcode or software instructions to perform the functions recited herein.

As to the block-division determinations, the intra-frame/inter-frame prediction module 210, for example, may determine to divide one 16×16 CU (Coding Unit) into one of four 8×8 PUs, two 8×16 PUs and two 16×8 PUs. Or, the intra-frame/inter-frame prediction module 210 may determine to divide one 8×8 CU into one of four 4×4 PUs, two 4×8 PUs and two 8×4 PUs.

Although the embodiments have been described in FIG. 2 as having specific elements, it should be noted that additional elements may be included to achieve better performance without departing from the spirit of the invention. While the process flows described in FIG. 1 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for RDO (Rate-Distortion Optimization) based on fit-curves, comprising:

calculating a first fit-curve and a second fit-curve according to information regarding a first frame;

carrying information regarding a second frame into the first and second fit-curves to calculate a plurality of fit distortions and a plurality of fit bit counts;

calculating a plurality of costs according to the fit distortions and the fit bit counts;

determining the best block-division mode for the second frame according to the costs; and dividing the second frame into blocks according to the best block-division mode and encoding the second frame;

wherein the step for calculating a first fit-curve and a second fit-curve according to information regarding a first frame further comprises:

obtaining a plurality of first distortions between a plurality of original pixel values and a plurality of predicted pixel values of a plurality of PUs (Prediction Units) of the first frame;

obtaining a plurality of second distortions between the original pixel values and a plurality of reconstructed pixel values of the PUs of the first frame;

calculating the first fit-curve according to the first distortions and the second distortions;

obtaining a plurality of first absolute values of syntax of residuals of the PUs of the first frame;

obtaining a plurality of bit counts required to encode the first frame; and calculating the second fit-curve according to the first absolute values of syntax of residuals and the bit counts;

wherein the step for calculating the first fit-curve according to the first distortions and the second distortions further comprises:

calculating the first fit-curve using Equations (1) and (2):

$$\begin{bmatrix} \sum_{i=1}^{N} 1 & \sum_{i=1}^{N} x_{i1} & \sum_{i=1}^{N} x_{i1}^2 & \sum_{i=1}^{N} x_{i1}^3 \\ \sum_{i=1}^{N} x_{i1} & \sum_{i=1}^{N} x_{i1}^2 & \sum_{i=1}^{N} x_{i1}^3 & \sum_{i=1}^{N} x_{i1}^4 \\ \sum_{i=1}^{N} x_{i1}^2 & \sum_{i=1}^{N} x_{i1}^3 & \sum_{i=1}^{N} x_{i1}^4 & \sum_{i=1}^{N} x_{i1}^5 \\ \sum_{i=1}^{N} x_{i1}^3 & \sum_{i=1}^{N} x_{i1}^4 & \sum_{i=1}^{N} x_{i1}^5 & \sum_{i=1}^{N} x_{i1}^6 \end{bmatrix} \cdot \begin{bmatrix} a_1 \\ b_1 \\ c_1 \\ d_1 \end{bmatrix} = \begin{bmatrix} \sum_{i=1}^{N} y_{i1} \\ \sum_{i=1}^{N} x_{i1} \cdot y_{i1} \\ \sum_{i=1}^{N} x_{i1}^2 \cdot y_{i1} \\ \sum_{i=1}^{N} x_{i1}^3 \cdot y_{i1} \end{bmatrix} \quad (1)$$

$$y_1(x) = a_1 \cdot x^3 + b_1 \cdot x^2 + c_1 \cdot x + d_1 \quad (2)$$

wherein $x_{i1}$ indicates the distortion between the original pixel value and the predicted pixel value of the i-th PU and $y_{i1}$ indicates the distortion between the original pixel value and the reconstructed pixel value of the i-th PU, and $a_1$, $b_1$, $c_1$ and $d_1$ indicates coefficients of the first fit-curve; and calculating the second fit-curve using Equations (3) and (4):

$$\begin{bmatrix} \sum_{i=1}^{N} 1 & \sum_{i=1}^{N} x_{i2} & \sum_{i=1}^{N} x_{i2}^2 & \sum_{i=1}^{N} x_{i2}^3 \\ \sum_{i=1}^{N} x_{i2} & \sum_{i=1}^{N} x_{i2}^2 & \sum_{i=1}^{N} x_{i2}^3 & \sum_{i=1}^{N} x_{i2}^4 \\ \sum_{i=1}^{N} x_{i2}^2 & \sum_{i=1}^{N} x_{i2}^3 & \sum_{i=1}^{N} x_{i2}^4 & \sum_{i=1}^{N} x_{i2}^5 \\ \sum_{i=1}^{N} x_{i2}^3 & \sum_{i=1}^{N} x_{i2}^4 & \sum_{i=1}^{N} x_{i2}^5 & \sum_{i=1}^{N} x_{i2}^6 \end{bmatrix} \cdot \begin{bmatrix} a_2 \\ b_2 \\ c_2 \\ d_2 \end{bmatrix} = \begin{bmatrix} \sum_{i=1}^{N} y_{i2} \\ \sum_{i=1}^{N} x_{i2} \cdot y_{i2} \\ \sum_{i=1}^{N} x_{i2}^2 \cdot y_{i2} \\ \sum_{i=1}^{N} x_{i2}^3 \cdot y_{i2} \end{bmatrix} \quad (3)$$

$$y_2(x) = a_2 \cdot x^3 + b_2 \cdot x^2 + c_2 \cdot x + d_2 \quad (4)$$

wherein $x_{i2}$ indicates the first absolute value of syntax of residual of the i-th PU and $y_{i2}$ indicates the bit count required to encode the syntax of the i-th PU, and $a_2$, $b_2$, $c_2$, and $d_2$ indicates coefficients of the second fit-curve.

2. The method of claim 1, wherein the first fit-curve and the second fit-curve are third-order functions.

3. The method of claim 1, wherein the step for carrying information regarding a second frame into the first and second fit-curves to calculate a plurality of fit distortions and a plurality of fit bit counts further comprises:

obtaining a plurality of third distortions between a plurality of original pixel values and a plurality of predicted pixel values of a plurality of PUs of the second frame;

carrying the third distortions into the first fit-curve to calculate the fit distortions;

obtaining a plurality of second absolute values of syntax of residuals of the PUs of the second frame; and carrying the second absolute values of syntax of residuals into the second fit-curve to calculate a plurality of fit bit counts.

4. The method of claim 3, wherein the step for calculating a plurality of costs according to the fit distortions and the fit bit counts further comprises:

calculating the costs using Equation (5):

$$\min\{J\}, J = D + \lambda \cdot R \quad (5)$$

wherein $\lambda$ indicates a Lagrange constant, $D'$ indicates the fit distortions, $R'$ indicates a total amount of the fit bit counts, and J indicates the costs.

5. An apparatus for RDO (Rate-Distortion Optimization) based on fit-curves, comprising:

an intra-frame/inter-frame prediction module;

an RD cost calculation module; and a curve-fitting module, wherein the curve-fitting module calculates a first fit-curve and a second fit-curve according to information regarding a first frame; and carries information regarding a second frame into the first and second fit-curves to calculate a plurality of fit distortions and a plurality of fit bit counts, wherein the RD cost calculation module calculates a plurality of costs according to the fit distortions and the fit bit counts, and wherein the intra-frame/inter-frame prediction module determines the best block-division mode for the second frame according to the costs; and divides the second frame into blocks according to the best block-division mode and encodes the second frame;

wherein the apparatus further comprises:

a distortion calculation module; and an entropy coding module, wherein the curve-fitting module obtains a plurality of first distortions between original pixel values and a plurality of predicted pixel values of a plurality of PUs (Prediction Units) of the first frame from the intra-frame/inter-frame prediction module; obtains a plurality of second distortions between the original pixel values and a plurality of reconstructed pixel values of the PUs of the first frame from the distortion calculation module; calculates the first fit-curve according to the first distortions and the second distortions; obtains a plurality of first absolute values of syntax of residuals of the PUs of the first frame from the intra-frame/inter-frame prediction module; obtains a plurality of bit counts required to encode the first frame from the entropy coding module; and calculates the second fit-curve according to the first absolute values of syntax of residuals and the bit counts;

wherein the first fit-curve is calculated using Equations (1) and (2):

$$\begin{bmatrix} \sum_{i=1}^{N} 1 & \sum_{i=1}^{N} x_{i1} & \sum_{i=1}^{N} x_{i1}^2 & \sum_{i=1}^{N} x_{i1}^3 \\ \sum_{i=1}^{N} x_{i1} & \sum_{i=1}^{N} x_{i1}^2 & \sum_{i=1}^{N} x_{i1}^3 & \sum_{i=1}^{N} x_{i1}^4 \\ \sum_{i=1}^{N} x_{i1}^2 & \sum_{i=1}^{N} x_{i1}^3 & \sum_{i=1}^{N} x_{i1}^4 & \sum_{i=1}^{N} x_{i1}^5 \\ \sum_{i=1}^{N} x_{i1}^3 & \sum_{i=1}^{N} x_{i1}^4 & \sum_{i=1}^{N} x_{i1}^5 & \sum_{i=1}^{N} x_{i1}^6 \end{bmatrix} \cdot \begin{bmatrix} a_1 \\ b_1 \\ c_1 \\ d_1 \end{bmatrix} = \begin{bmatrix} \sum_{i=1}^{N} y_{i1} \\ \sum_{i=1}^{N} x_{i1} \cdot y_{i1} \\ \sum_{i=1}^{N} x_{i1}^2 \cdot y_{i1} \\ \sum_{i=1}^{N} x_{i1}^3 \cdot y_{i1} \end{bmatrix} \quad (1)$$

$$y_1(x) = a_1 \cdot x^3 + b_1 \cdot x^2 + c_1 \cdot x + d_1 \quad (2)$$

wherein $x_{i1}$ indicates the distortion between the original pixel value and the predicted pixel value of the i-th PU and $y_{i1}$ indicates the distortion between the original pixel value and the reconstructed pixel value of the i-th PU, and $a_1$, $b_1$, $c_1$ and $d_1$ indicates coefficients of the first fit-curve; and wherein the second fit-curve is calculated using Equations (3) and (4):

$$\begin{bmatrix} \sum_{i=1}^{N} 1 & \sum_{i=1}^{N} x_{i2} & \sum_{i=1}^{N} x_{i2}^2 & \sum_{i=1}^{N} x_{i2}^3 \\ \sum_{i=1}^{N} x_{i2} & \sum_{i=1}^{N} x_{i2}^2 & \sum_{i=1}^{N} x_{i2}^3 & \sum_{i=1}^{N} x_{i2}^4 \\ \sum_{i=1}^{N} x_{i2}^2 & \sum_{i=1}^{N} x_{i2}^3 & \sum_{i=1}^{N} x_{i2}^4 & \sum_{i=1}^{N} x_{i2}^5 \\ \sum_{i=1}^{N} x_{i2}^3 & \sum_{i=1}^{N} x_{i2}^4 & \sum_{i=1}^{N} x_{i2}^5 & \sum_{i=1}^{N} x_{i2}^6 \end{bmatrix} \cdot \begin{bmatrix} a_2 \\ b_2 \\ c_2 \\ d_2 \end{bmatrix} = \begin{bmatrix} \sum_{i=1}^{N} y_{i2} \\ \sum_{i=1}^{N} x_{i2} \cdot y_{i2} \\ \sum_{i=1}^{N} x_{i2}^2 \cdot y_{i2} \\ \sum_{i=1}^{N} x_{i2}^3 \cdot y_{i2} \end{bmatrix} \quad (3)$$

$$y_2(x) = a_2 \cdot x^3 + b_2 \cdot x^2 + c_2 \cdot x + d_2 \quad (4)$$

wherein $x_{i2}$ indicates the first absolute value of syntax of residual of the i-th PU and $y_{i2}$ indicates the bit count required to encode the syntax of the i-th PU, and $a_2$, $b_2$, $c_2$ and $d_2$ indicates coefficients of the second fit-curve.

6. The apparatus of claim 5, wherein the first fit-curve and the second fit-curve are third-order functions.

7. The apparatus of claim 5, wherein the curve fitting module obtains a plurality of third distortions between a plurality of original pixel values and a plurality of predicted pixel values of PUs of the second frame from the intra-frame/inter-frame prediction module; carries the third distortions into the first fit-curve to calculate the fit distortions; obtains a plurality of second absolute values of syntax of residuals of the PUs of the second frame from the intra-frame/inter-frame prediction module; and carries the second absolute values of syntax of residuals into the second fit-curve to calculate fit bit counts.

8. The apparatus of claim 7, wherein the costs is calculated using Equation (5):

$$\min\{J'\}, J' = D' + \lambda \cdot R' \quad (5)$$

wherein $\lambda$ indicates a Lagrange constant, $D'$ indicates the fit distortions, $R'$ indicates a total amount of the fit bit counts, and $J'$ indicates the costs.

* * * * *